(12) United States Patent  (10) Patent No.: US 7,865,042 B2
Cattrone et al.  (45) Date of Patent: Jan. 4, 2011

(54) DOCUMENT MANAGEMENT METHOD USING BARCODE TO STORE ACCESS HISTORY INFORMATION

(75) Inventors: Paul Cattrone, Pleasant Hill, CA (US); Hiroshi Tomita, Palo Alto, CA (US); Vivek Pathak, Mountain View, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 1197 days.

(21) Appl. No.: 11/343,662

(22) Filed: Jan. 31, 2006

(65) Prior Publication Data

US 2007/0177824 A1   Aug. 2, 2007

(51) Int. Cl.
G06K 9/54 (2006.01)
G06K 7/10 (2006.01)

(52) U.S. Cl. .................................. 382/306; 235/462.01
(58) Field of Classification Search .................. 382/305, 382/306, 137, 100; 707/100, 102, 103 R, 707/103 Y; 369/47.1; 235/462.01
See application file for complete search history.

(56) References Cited

U.S. PATENT DOCUMENTS 5,113,445 A    5/1992  Wang
5,490,217 A    2/1996  Wang et al.
5,760,382 A    6/1998  Li et al.
2004/0267595 A1*  12/2004  Woodings et al. ............... 705/9
2006/0158979 A1*  7/2006  Nakamura et al. ......... 369/47.1

* cited by examiner

Primary Examiner—Yon Couso
(74) Attorney, Agent, or Firm—Chen Yoshimura LLP

(57) ABSTRACT

A method is described in which metadata regarding a document is encoded as 2d barcode printed on the same recording medium as the document, where the metadata includes an access history of the document and other information. When a printed document including such barcode is copied, the copy includes new barcode containing updated metadata that replaces the original barcode, where the updated metadata includes a record of the current copying or scanning action. When a printed document including such barcode is scanned, the metadata contained in the barcode is extracted and stored. Also described is a document management system including a server connected to one or more clients, scanners, printers, and a storage device for storing documents and metadata. The server includes a digital stamp engine that generates barcode data representing metadata, and supports a variety of workflows including print, barcode generation, scan, copy, barcode update, etc.

20 Claims, 3 Drawing Sheets

DOCUMENT MANAGEMENT METHOD USING BARCODE TO STORE ACCESS HISTORY INFORMATION

BACKGROUND OF THE INVENTION

1. Field of the Invention

This invention relates to a method and system of document management, and in particular, it relates to the application of barcode, such as two-dimensional barcode, in document management.

2. Description of the Related Art

Many electronic document management systems store metadata about the documents. For example, Microsoft® Windows stores information about a document including the date and time the document was created, modified and accessed, location, size, title, subject, author, category, keywords, comments, etc. Some server-based document management systems, often used by large organizations to allow multiple members of the organization to create, modify and access documents on the server, store more extensive metadata about each document such as access history (a record of the creation, modification, viewing, copying, printing and/or scanning of the document by any user and the date and time of such actions), access control information, document retention policy information, category, the organization or project to which each document belong, routing information, etc. The type of metadata stored by a document management system can often be tailored to the need of the organization deploying the system. The document management system uses the metadata to organize documents and aid in document retrieval by users.

When documents are printed, however, most metadata is typically not retained in the printed document. Some server-based document management system will include a unique document number in the footer (or elsewhere) of the printed document. Microsoft® Word also allows the user to include certain metadata in the printed document (e.g. by inserting field codes). The printed metadata will typically be printed as text strings. The amount of metadata that can be printed with the document is limited as a practical matter.

Barcode has been used on printed documents for various purposes. For example, U.S. patent documents have barcode printed on the front page.

SUMMARY OF THE INVENTION

The present invention is directed to a method and apparatus using 2d barcode or other forms of machine-readable symbology to encode and print metadata, in particular, information about the access history of the document, on a printed document.

An object of the present invention is to provide printed documents that contain its access history information in a 2d barcode or other forms of machine-readable symbology.

Another object of the present invention is to provide a method and apparatus for updating access history information of a printed document when the document is printed, copied or scanned.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a method for managing documents implemented on a computer, which includes: (a) obtaining an electronic copy of a document and metadata about the document, the metadata including an access history of the document; (b) rendering barcode data representing the metadata; and (c) carrying out at least one of (c1) through (c4): (c1) printing the document and the barcode data on a recording medium; (c2) displaying the document and the barcode data on a display device; (c3) storing the document and the barcode data in association with the document; and (c4) transmitting the document and the barcode data in association with the document to an external device.

In a print mode, the document and the barcode representing the metadata including access history information are printed on a recording medium. In a generate barcode mode, the barcode data is stored in associate with the document. In a scan or copy mode, the document and metadata are obtained by (a1) scanning an original copy of the document, the original copy bearing barcode containing metadata about the document; (a2) detecting barcode in the scanned document and extracting metadata from the barcode; and (a3) updating the metadata by adding to the access history a record of the scanning of the document.

In another aspect, the present invention provides a method for managing documents implemented on a computer, which includes: (a) scanning an original copy of the document, the original copy bearing barcode containing metadata about the document, the metadata including an access history of the document; (b) detecting barcode in the scanned document and extracting metadata from the barcode; and (c) storing the document and the metadata.

The present invention is also directed to computer program products that cause a data processing apparatus to perform the above methods.

In yet another aspect, the present invention provides a document management system which includes: a scanning section for scanning hard copy documents; a printing section for printing documents; storage device for storing documents and metadata about the documents; a computer connected to the scanning section, the printing section and the storage device, the computer including a digital stamp engine for (a) obtaining a document and metadata about the document from the storage device or an external device, the metadata including an access history of the document, (b) detecting any barcode in a document received from the scanning section, the storage device or an external device, and extracting metadata from the detected barcode, (c) updating the metadata by adding to the access history a record of a current scanning, printing, or storing action, (d) rendering barcode data representing updated metadata, and (e) associating the rendered barcode with the document.

It is to be understood that both the foregoing general description and the following detailed description are exemplary and explanatory and are intended to provide further explanation of the invention as claimed.

DETAILED DESCRIPTION OF THE PREFERRED EMBODIMENTS

Two-dimensional barcode (2d barcode) is a form of machine-readable symbology for encoding data. 2d barcode can be used to encode text, numbers, images, and binary data streams in general, and has been used in identification cards, shipping labels, certificates and other documents, etc. One widely used 2d barcode standard is the PDF417 standard, and software and hardware products have been available to print and read such 2d barcode. Color barcode has also been proposed.

According to embodiments of the present invention, metadata regarding a document is encoded as 2d barcode (sometimes referred to as a digital stamp), which is included on the document when the document is printed. The metadata includes an access history of the document, i.e., a record of the creation, modification, viewing, copying and/or printing of the document by any user and the date and time of such actions. The metadata may also include one or more of the following: location, size, title, subject, author, category, keywords, comments, access control information (e.g., who has what level of access to the document), document retention policy associated with the document (e.g., how long will the document be retained on the server), the organization or project to which each document belong, routing information, and any other desirable metadata regarding the document. According to other embodiments of the present invention, when a printed document including such barcode is scanned or copied, the scanner or copier scans the document, detects the barcode and extracts the metadata encoded in the barcode, updates the metadata such as by adding a record of the scanning or copying action being executed, and (in the case of a copier) encodes the updated metadata in updated barcode and prints the document with the updated barcode. These steps may be performed by a processor in the printer, scanner or copier or by an external computer connected to the printer, scanner or copier.

Figure 1:
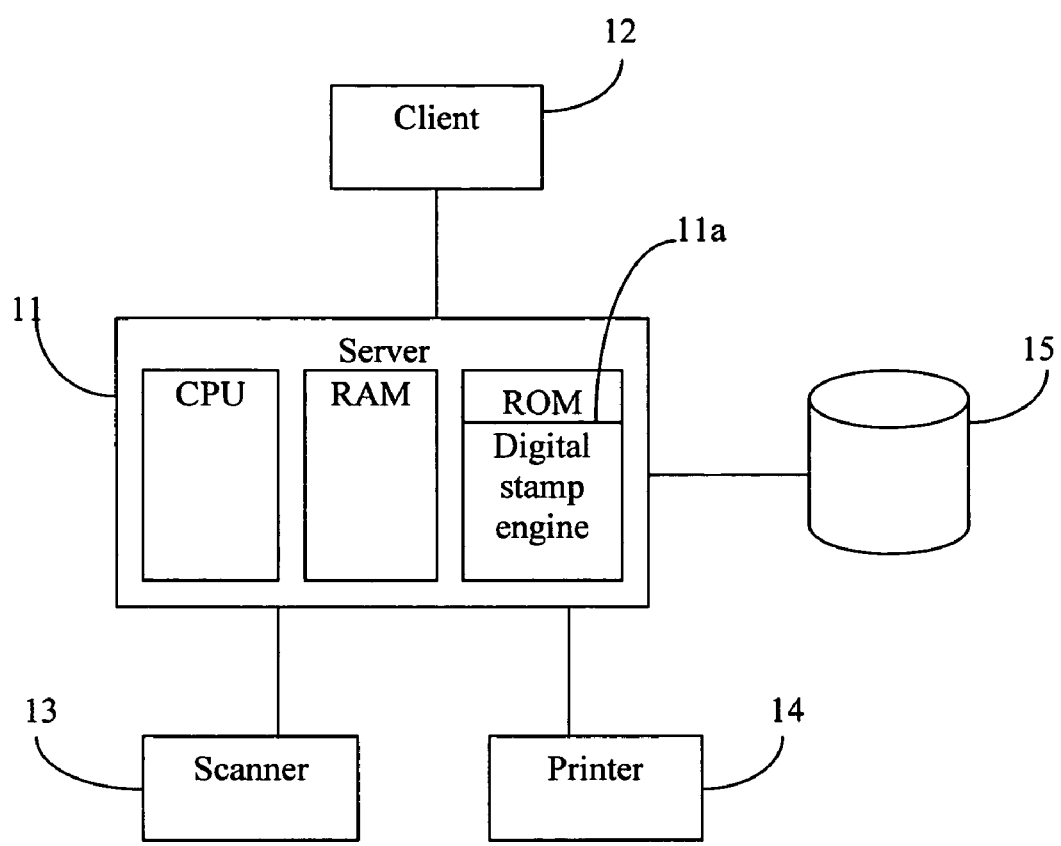
FIG. 1 illustrates a document management system according to embodiments of the present invention.

FIG. 1 illustrates a document management system according to an embodiment of the present invention. The document management system 10 includes a server 11 connected to one or more clients 12, one or more scanners 13, one or more printers 14, and one or more mass storage devices 15 (which is often considered a part of the server) for storing documents. Although the scanner 13 and printer 14 are illustrated as separate devices, they may be physically the same device; for example, they may be the scanning section and the printing section of a copier/scanner/printer multi function machine or the like. The scanner 13 and the printer 14 may be provided with a user interface panel to allow a user to operate the system via the scanner or the printer. The server 11 stores a plurality of documents together with metadata about the documents in the storage device 15. The server includes a digital stamp engine 11a (implemented by hardware or software loaded in a ROM) which functions to extract and decode 2d barcode from a digital document and to encode desired metadata as 2d barcode. In this embodiment, the server 11 comprises a central processing unit (CPU), a random access memory (RAM), and a read only memory (ROM), and the digital stamp engine 11a is implemented by software stored in the ROM and is executed by the CPU with the RAM. This system supports a variety of document workflow described below. The document management system 10 may additionally perform documents and metadata management functions performed by a conventional document management system.

Figures 2, 3:
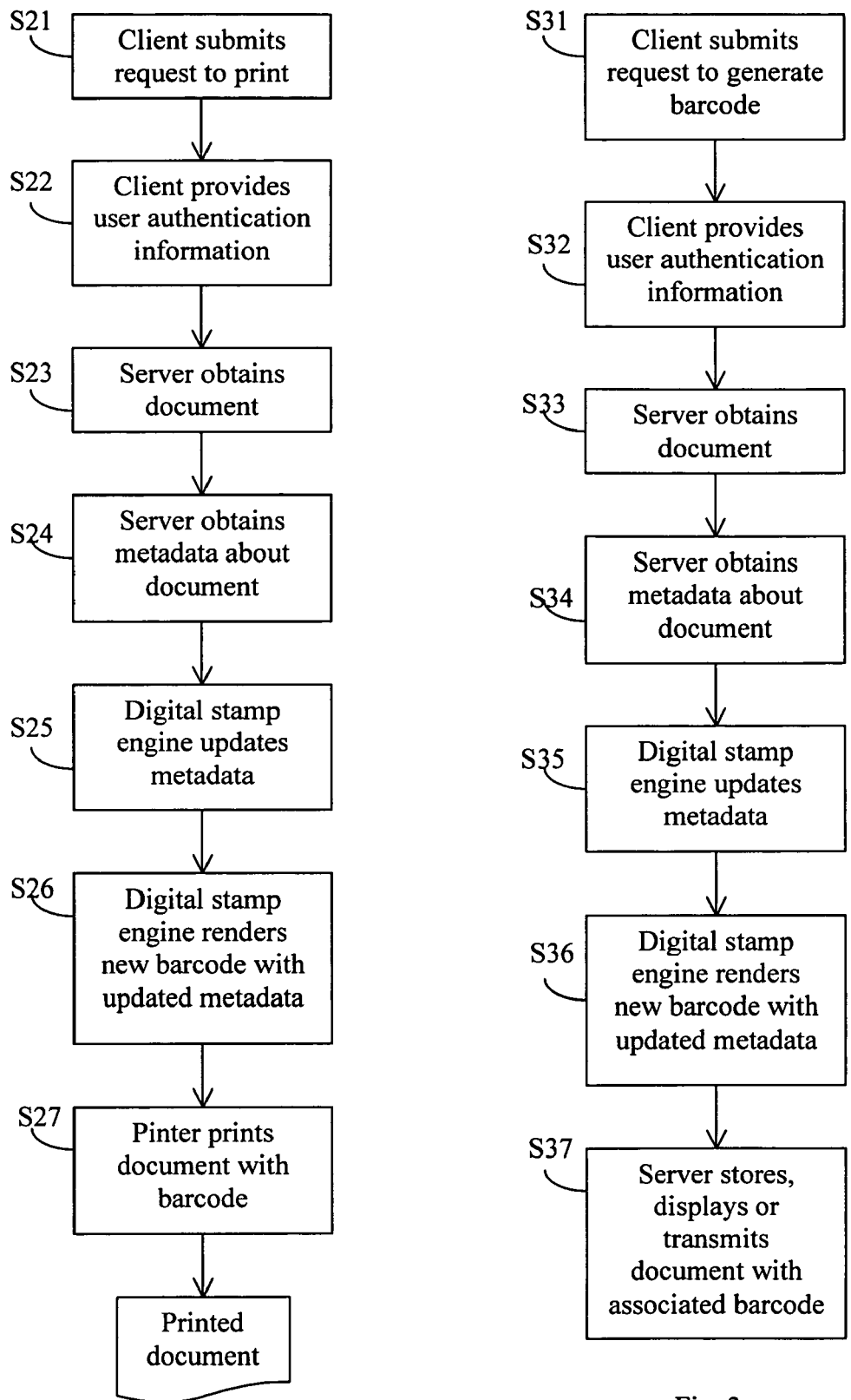
FIG. 2 is a flow chart showing a print mode according to an embodiment of the present invention.
FIG. 3 is a flow chart showing a generate barcode mode according to an embodiment of the present invention.

In a first workflow (FIG. 2), referred to as a "print mode" for convenience, the document management system 10 can print an electronic document with barcode encoding metadata on the printed document at the request of a client 12. The client 12 submits a print request which includes a request to print metadata as barcode on the printed document (Step S21). Optionally, user authentication information (such as user id and password) may be required from the client (the user) in order to print the document (Step S22). The server obtains the document (Step S24) and metadata about the document (Step S24). The document to be printed (the source document) may be a document stored in the storage device 15 or a document supplied by the client 12. The source document may originate from any suitable source, such as word processing applications, spreadsheet applications, graphics applications, email applications, web browser applications, scanners, digital cameras, etc. If the source document is stored in the storage device, the server retrieves the document and the metadata to be included in the barcode. If the source document is supplied by the client 12, the client will also supply desired metadata to be included. The digital stamp engine 11a renders barcode representing the metadata (Step S26) and the printer 14 prints the document which bears the barcode as a part of the printed document (Step S27). Printing typically involves the action of both the application program normally used to manipulate the document (such as Microsoft® Word, etc.) and a printer driver that controls the printer; the digital stamp engine will interact with the application program and/or the printer driver to insert the barcode into the document. The mechanism of how this is accomplished will be readily understood by those skilled in the relevant art and not described in detail here. The barcode can be printed anywhere on the document, either set by default or selected by the user; preferably, it is printed in a margin or footer area of the first page of the document or on the last page. If desired, the barcode may also be printed on every page of the document. When the barcode and the document are said to be printed on the same recording medium, it is meant that the barcode is printed on the same physical piece of the recording medium (i.e. a sheet of paper) where at least a part of the document is printed. It would exclude, for example, printing the barcode on a separate adhesive label and later affixing the label on to the medium (i.e. a sheet of paper) where the document is printed. Preferably, before rendering the barcode, the digital stamp engine updates the metadata retrieved by the server or supplied by the client (Step S25) to include a record of the current printing action in the access history, e.g., the user who requested the printing and the time of the print request. Other information may also be included in the updated metadata. If desired, the digital stamp engine may encrypt the metadata before rendering the barcode.

In a second workflow (FIG. 3), referred to as a "generate barcode mode" for convenience, at the request of a client 12, the system 10 can process an electronic document (the source document) and the metadata about the document, render a barcode image that encode the metadata, associate the rendered barcode with the processed document (e.g. embedding it in the processed document), and either store the processed document with the associated barcode in the storage device 15 as an electronic document, or display it on a display device, or transmit it to another computer (either the client 12 or a computer external to the system). When a stored document is later printed out or displayed, or when a transmitted document is printed out or displayed by another computer, the associated barcode generated by the digital stamp engine will be printed or displayed as a part of the printed or displayed document (with or without further updating or generating new barcode). In one example, both the source document and the processed document are Word documents, and the rendered barcode is embedded in the processed Word document as an object. In another example, the source document is a Word document and the processed document is a PDF document where and the rendered barcode is a part of the PDF image that represent the content of the Word document. Documents of other desired formats can be processed; generally, the source document and the processed document may have the same document format or different formats. Associating the bar code with the document may be done by embedding the barcode in the document, which may be accomplished in any suitable manner consistent with the format of the document, or alternatively, by storing the barcode as a separate file linked to the document in a suitable manner. Similarly, the document and the barcode can be transmitted with the barcode embedded in the document or with the barcode stored in a separate file transmitted together with the document. The separate barcode file may later be combined with the document when the document is printed or displayed. In the second workflow the system processes the metadata in a similar way as in the first workflow (Steps S31 through S36), but the processed document with the barcode is stored, displayed or transmitted (Step S37) rather than printed from the printed 14 as in the first workflow.

Figure 4:
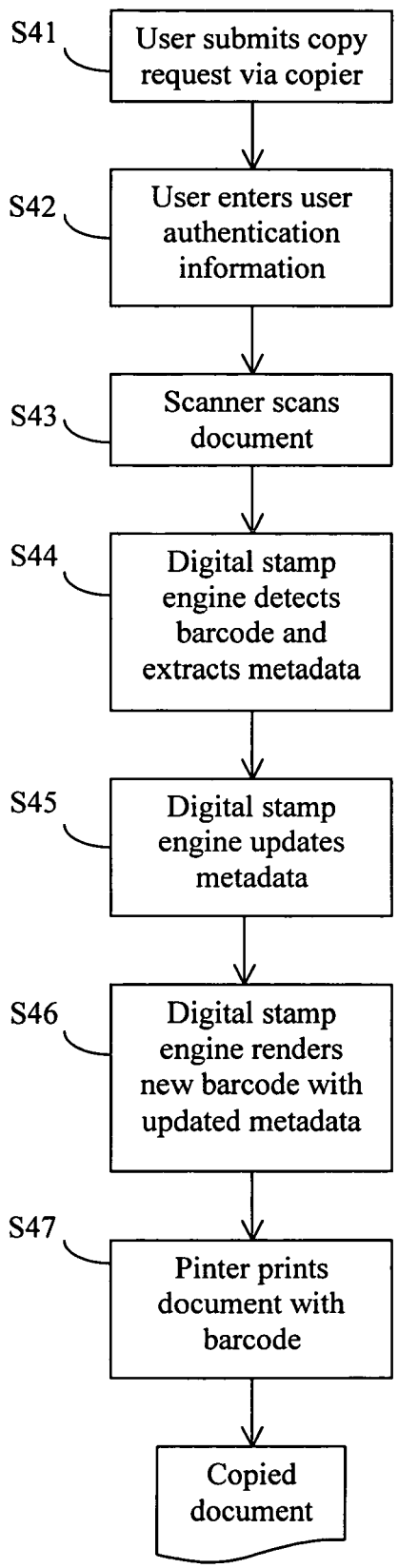
FIG. 4 is a flow chart showing a copy mode according to an embodiment of the present invention.

In a third workflow (FIG. 4), referred to as a "copy mode" for convenience, the document management system 10 can make a hard copy of a printed document (the original document) which bears barcode containing metadata, where the copied document has barcode containing updated metadata. To accomplish this, the user places the original document in the scanner 13 or copier and submits a copy request via the user interface panel on the scanner or copier (Step S41). Optionally, the system may require the user to enter user authentication information (such as user id and password) in order to copy the document (Step S42). The scanner 13 scans the original document into a scanned electronic document (Step S43). The digital stamp engine 11a detects the barcode in the scanned document, and extracts the metadata contained in the barcode (including decrypting the metadata if it has been encrypted) (Step S44). The digital stamp engine updates the metadata (Step S45), for example, by adding information about the user who is making the copy and the time the copy is made. Other desirable updates may be made to the metadata. If desired, the digital stamp engine may encrypt the metadata. The digital stamp engine then renders new barcode representing the updated metadata (Step S46) and embeds it in the scanned document, and the printer 14 prints the document which bears the new barcode as a part of the copied document that replaces the barcode in the original document (Step S47). As noted earlier, the scanner 13 and printer 14 may be the scanning section and printing section of a copier or a scanner/printer/copier multifunction machine. If the user desires, the system can be used to make a hard copy of the document bearing barcode where the copy has no barcode. In this case Step 45 would be omitted, and Step S46 would involve stripping the existing barcode from the document without embedding a new barcode in it. This scenario can also be view as a barcode replacement step (Step S46) where the new barcode is blank.

Figure 5:
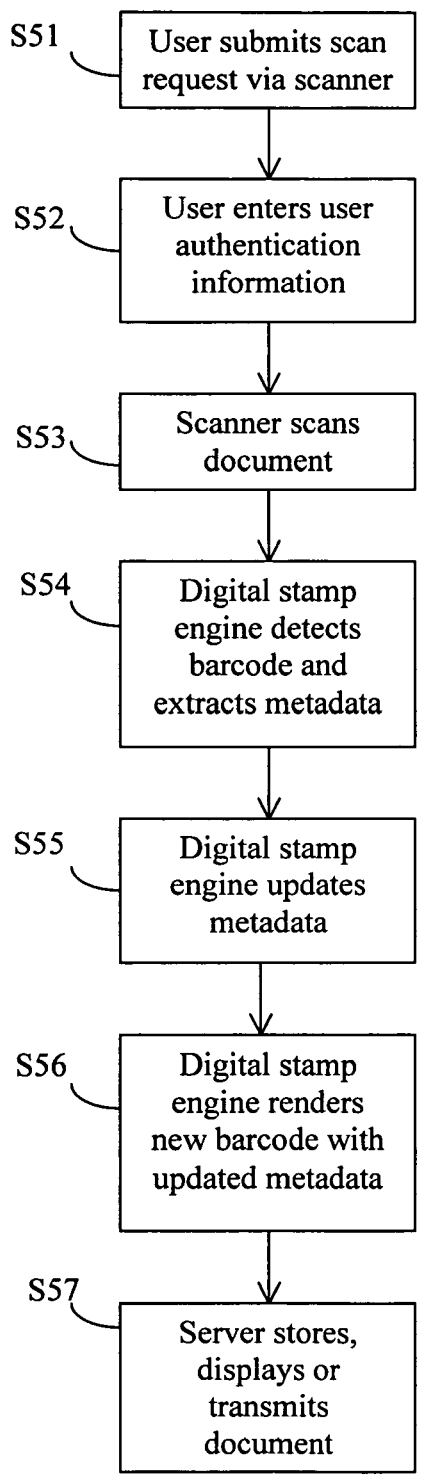
FIG. 5 is a flow chart showing a scan mode according to an embodiment of the present invention.

In a fourth workflow (FIG. 5), referred to as a "scan mode" for convenience, the document management system 10 can scan a printed document (the original document) which bears barcode containing metadata, extracting the metadata from the barcode, updates the metadata (optional), renders new barcode representing the updated metadata and embeds the new barcode in the scanned document to replace the existing barcode (optional), and store an electronic version of the scanned document on the server or transmits it to another device with the metadata and/or barcode depending on the user's choice. In this workflow the system scans and processes the document in a similar way as in the third workflow (Steps S51 through S56), but the scanned document with the barcode is stored, displayed or transmitted (Step S57) rather than printed from the printer 14 as in the third workflow. This workflow can be used to recover the metadata contained in the barcode on a printed document. The recovered metadata is preferably stored on the server, and the document itself can be stored on the server or transmitted to another device in a manner as desired by the user. For example, the document may be stored on the server and used in a conventional way (i.e. without having barcode embedded in it to represent metadata). The document may also be stored in association with barcode containing updated metadata (either as embedded barcode or as a separate barcode file), similar to a document generated in the second workflow. The document can also be transmitted to another device with the metadata in a conventional form, or with associated barcode representing metadata, or without any metadata. In another application of this workflow, if the barcode in the scanned document includes routing information as a part of the metadata, it can be used to automatically route the scanned document, such as sending it to particular users (clients) or particular peripheral devices.

In a variation of the fourth workflow (variation of the scan mode), the digital stamp engine 11a detects the barcode in the scanned document, extracts the metadata, removes the barcode data from the scanned document, and stores the metadata in a conventional way without generating new barcode representing updated metadata. Such a stored document and metadata can be used by any document management system, and can be printed later using the method of the first workflow (print mode) to print the document with barcode encoding updated metadata, or processed using the method of the second workflow to generate barcode encoding updated metadata.

In a fifth workflow, referred to as an "update barcode mode" for convenience, the document management system 10 can process a digital document that has barcode associated therewith to extract and update the metadata and to generate new barcode with the updated metadata. The new barcode is associated with the document (as embedded barcode or a separate barcode file) to replace the existing barcode, and the document and the updated barcode are stored back on the server, displayed, returned to the client or transmitted to an external device. The steps involved in this workflow are generally similar to steps S54 to S57 of the fourth workflow ("scan mode"), but the electronic document from which the barcode is detected is a document already stored on the server or supplied by the client 12, rather than a scanned document from the scanner as in the fourth workflow.

A document management system 10 according to embodiments of the present invention may support one or more of the above-described workflows. As seen from the above descriptions, most of the workflows (except for the variation of the fourth workflow—see below) include a process of obtaining an electronic copy of a document and metadata about the document, and generating barcode date that represent the metadata. At the input end of this process, the document and the metadata may be supplied from the storage device 15, the client 12, or the scanner 13. At the output end of the process, the document and the barcode representing the metadata can be printed on the same recording medium, stored in the storage device in association with each other for later use, displayed together on a display device, or transmitted to another device in association with each other for use by the other device. The variation of the scan mode can be used to extract metadata from a barcode in the scanned document and store the metadata in a conventional way without re-generating barcode representing metadata.

The document management system 10 shown in FIG. 1 is based on a client/server architecture so that barcode can be updated and managed from a central point and serves many users (clients). This architecture is suitable for use by an organization. In an alternative embodiment, the document management system includes personal computer that is connected to a scanner and a printer, where the digital stamp engine is implemented as software running on the PC. The various workflows described above would work the same way as in the client/server environment except that the PC would play the roll of both the server 11 and the client 12.

In another embodiments, all or a part of the functionality of the digital stamp engine may reside in a processor of a printer, scanner, copier, or a printer/scanner/copier multifunction machine. One example (FIG. 6) is a copier that can perform the third workflow (copy mode) described above in a standalone configuration, i.e., without using resources from external devices. This requires the copier to have a processor loaded with software to perform the steps of barcode detection, metadata extraction and updating, new barcode rendering and embedding, etc. of the third workflow. Another example is a printer having a processor loaded with software to perform the barcode rendering function.

From the above descriptions, it can be seen that a feature of embodiments of the present invention is to generate printed documents which bear barcode representing metadata about the documents. An advantage of the present invention is that metadata stays with the document in for form of 2d barcode so that the document retains this data even in printed form. Including metadata in printed document has many practical advantages in document handling and management. For example, the metadata can be used to rectify problems in document sorting by human operators. The metadata can be used to automatically direct scanned document flow from the digital scanner into a document workflow system. Once a document is created with metadata, the potential for human error in document management is greatly reduced. It would be able to trace a problem in document routing back to a user. Routing information is not lost when the document is printed on paper and then later scanned back to digital form.

Preferred embodiments of the present invention use 2d barcode to encode the metadata. Other machine-readable symbologies may also be used. For example, one-dimensional barcode may be used, although such barcodes may not have sufficient data capacity to store all the desired metadata. Both black and white and color 2d barcode may be used. Multiple barcodes may be used if necessary. As used in this disclosure, the term "barcode" should be broadly understood to refer to any machine-readable symbology that contains information, including but not limited to 1d and 2d barcodes. Depending on the context, the term "barcode" may refer to such machine-readable symbology in the printed or displayed form, or data in electronic form that, when printed or displayed, depicts a barcode. The term "barcode data" refers to such data in electronic form.

It should be understood that the electronic form of a document may only exist transiently, and electronic signals representing different parts of the document may not exist simultaneously. For example, in a copy mode of the present invention, an implementation is possible where a portion (a physical page or part of a page) of the hard copy original image is scanned and printed, and the data is discarded or partially discarded before the next portion of the original image is scanned and printed. Such an implementation is encompassed within the scope of the present invention even though different portions of the source document or processed document exist only transiently at different times.

While the above descriptions describe printing the document and barcode containing metadata on the recording medium, there are other methods of storing metadata on the physical medium on which the document is printed. It has been proposed that IC tags may be embedded in sheets of paper which can record information. Thus, according to another embodiment of the present invention, metadata may be recorded on such an IC tag. According to yet another embodiment of the present invention, metadata may be recorded on the recording medium using invisible ink such as UV ink, magnetic ink, etc. Using such means, the metadata can be retained on the recording medium with the printed document, and recovered when the document is copied or scanned by using special detectors that detect and recovers the information recording in the IC tag or the invisible ink. All of these methods, as well as the method of encoding metadata in barcode, record and recover a machine-readable-only representation of metadata carried on the recording medium.

It will be apparent to those skilled in the art that various modification and variations can be made in the selective image encoding and replacement method and apparatus of the present invention without departing from the spirit or scope of the invention. Thus, it is intended that the present invention cover modifications and variations that come within the scope of the appended claims and their equivalents.

What is claimed is:

1. A method for managing documents implemented on a computer, comprising:
   (a) obtaining an electronic copy of a document and metadata about the document, the metadata including an access history of the document;
   (b) rendering barcode data representing the metadata including the access history of the document; and
   (c) applying the barcode data to the document, where the barcode data including the access history of the document at the time the barcode data is applied to the document, by carrying out at least one of (c1) through (c4):
   (c1) printing the document and the barcode data on a recording medium;
   (c2) displaying the document and the barcode data on a display device;
   (c3) storing the document and the barcode data in association with the document in a mass storage device; and
   (c4) transmitting the document and the barcode data in association with the document to an external device.

2. The method of claim 1, wherein the metadata further includes at least one of: location, size, title, subject, author, category, keywords, comments, access control information, document retention information, organization or project information, and routing information.

3. The method of claim 1, wherein step (a) includes retrieving a stored electronic copy of the document and the metadata from a storage device.

4. The method of claim 1, further including receiving a print request from a user prior to step (a), wherein step (a) includes retrieving a stored electronic copy of the document and the metadata from a storage device, and wherein step (c) includes carrying out step (c1).

5. The method of claim 1, further including receiving a request to generate barcode from a user prior to step (a), wherein step (a) includes retrieving a stored electronic copy of the document and the metadata from a storage device, and wherein step (c) includes carrying out step (c1).

6. The method of claim 1, wherein step (a) includes:

(a1) scanning an original copy of the document, the original copy bearing barcode containing metadata about the document;

(a2) detecting barcode in the scanned document and extracting metadata from the barcode; and (a3) updating the metadata by adding to the access history a record of the scanning of the document.

7. The method of claim 1, further including receiving a copy request from a user prior to step (a), wherein step (a) includes:

(a1) scanning an original copy of the document, the original copy bearing barcode containing metadata about the document;

(a2) detecting barcode in the scanned document and extracting metadata from the barcode; and (a3) updating the metadata by adding to the access history a record of the scanning and printing of the document; and wherein step (c) includes carrying out step (c1), the printed barcode replacing the barcode in the original document.

8. The method of claim 1, further including receiving a scan request from a user prior to step (a), wherein step (a) includes:

(a1) scanning an original copy of the document, the original copy bearing barcode containing metadata about the document;

(a2) detecting barcode in the scanned document and extracting metadata from the barcode; and (a3) updating the metadata by adding to the access history a record of the scanning of the document; and wherein step (c) includes carrying out step (c3).

9. The method of claim 1, further including:

(d) before the rendering step (b), updating the metadata obtained in step (a) by adding to the access history a record of the current printing, displaying, storing or transmitting action.

10. The method of claim 1, further including:

(e) prior to step (c), receiving user authentication information.

11. The method of claim 1, wherein the barcode data is two-dimensional barcode data.

12. The method of claim 1, wherein the barcode data is color barcode data.

13. A method for managing documents implemented on a computer, comprising:

(a) scanning an original copy of the document into a scanned electronic document, the original copy bearing barcode containing metadata about the document, the metadata including an access history of the document;

(b) detecting barcode in the scanned electronic document and extracting metadata including the access history of the document from the barcode; and (c) storing the scanned electronic document and the metadata to include the access history of the document at the time the metadata is stored.

14. A computer program product comprising a computer usable medium having a computer readable code embodied therein for controlling a data processing apparatus, the computer readable program code configured to cause the data processing apparatus to execute a process for managing documents comprising the steps of:

(a) obtaining an electronic copy of a document and metadata about the document, the metadata including an access history of the document;

(b) rendering barcode data representing the metadata including the access history of the document; and (c) applying the barcode data to the document, where the barcode data including the access history of the at the time the barcode data is applied to the document, by carrying out at least one of (c1) through (c4):

(c1) printing the document and the barcode data on a recording medium;

(c2) displaying the document and the barcode data on a display device;

(c3) storing the document and the barcode data in association with the document; and (c4) transmitting the document and the barcode data in association with the document to an external device.

15. A computer program product comprising a computer usable medium having a computer readable code embodied therein for controlling a data processing apparatus, the computer readable program code configured to cause the data processing apparatus to execute a process for managing documents comprising the steps of:

(a) detecting barcode in a document obtained by scanning an original copy of the document and extracting metadata from the detected barcode, the metadata including an access history of the document; and (b) storing the document and the metadata to include the access history of the document at the time the metadata is stored.

16. A document management system comprising:

a scanning section for scanning hard copy documents;

a printing section for printing documents;

storage device for storing documents and metadata about the documents;

a computer connected to the scanning section, the printing section and the storage device, the computer including a digital stamp engine for (a) obtaining a document and metadata about the document from the storage device or an external device, the metadata including an access history of the document, (b) detecting any barcode in a document received from the scanning section, the storage device or an external device, and extracting metadata from the detected barcode including the access history of the document, (c) updating the metadata by adding to the access history a record of a current scanning, printing, or storing action as a part of the access history, (d) rendering barcode data representing updated metadata, and (e) associating the rendered barcode with the document, where the barcode include the access history of the document at the time the barcode is associated to the document.

17. The document management system of claim 16, wherein the metadata further includes one or more of: location, size, title, subject, author, category, keywords, comments, access history, document retention information, organization or project information, and routing information.

18. The document management system of claim 17, wherein the barcode data is two-dimensional barcode data.

19. The document management system of claim 17, wherein the barcode data is color barcode data.

20. A method implemented on a computer connected to a printer for electrically managing documents, comprising:
  printing a document on a recording medium; and
  printing a machine-readable-only representation of metadata about the document on the recording medium, the metadata including an access history of the document at the time the machine-readable-only representation of metadata is printed on the recording medium.

* * * * *